US008401156B1

(12) United States Patent
Milro et al.

(10) Patent No.: US 8,401,156 B1
(45) Date of Patent: Mar. 19, 2013

(54) REAL-TIME MONITORING OF CALLER EXPERIENCE IN A CALL FLOW

(75) Inventors: James Elwood Milro, Omaha, NE (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 1441 days.

(21) Appl. No.: 12/028,248

(22) Filed: Feb. 8, 2008

(51) Int. Cl.
*H04M 1/64* (2006.01)
*H04M 3/00* (2006.01)

(52) U.S. Cl. .................. 379/88.01; 379/265.03

(58) Field of Classification Search ..... 379/88.01–88.19
See application file for complete search history.

(56) References Cited

U.S. PATENT DOCUMENTS

| 7,003,079 | B1* | 2/2006 | McCarthy et al. ......... 379/32.01 |
| 2004/0203698 | A1* | 10/2004 | Comp .......................... 455/421 |
| 2005/0074113 | A1* | 4/2005 | Mathew et al. .......... 379/265.02 |
| 2005/0078805 | A1* | 4/2005 | Mills et al. .................. 379/67.1 |

* cited by examiner

*Primary Examiner* — Simon Sing
*Assistant Examiner* — Solomon Bezuayehu

(57) ABSTRACT

A method, a system, and computer readable medium comprising instructions for monitoring caller experience in a call flow are provided. The method comprises collecting at least one selection by at least one caller in a call flow, generating performance analysis of a voice response system, combining the at least one selection and the performance analysis into a set of data, applying a monitoring formula to the set of data to form a result representing caller experience; and presenting the result to at least one service provider.

25 Claims, 9 Drawing Sheets

| TRAIT | VALUE=1-5 | RED | YELLOW | GREEN | 1 | 2 | 3 | 4 | 5 |
|---|---|---|---|---|---|---|---|---|---|
| NEGATIVE BEHAVIOR | FULL | COMBINED 1X TIMEOUTS AND INVALIDS OVER 15% | COMBINED 1X TIMEOUTS, AND INVALIDS FROM 6-14% | COMBINED 1X TIMEOUTS, AND INVALIDS UNDER 6% | >15% | 12-14% | 9-12% | 6-8% | 0-5% |
| CALLER DISCONTENT | FULL | COMBINED FINAL TIMEOUTS, INVALIDS AND INAPPROPRIATE HANG UPS OVER 10% | COMBINED FINAL TIMEOUTS, INVALIDS AND INAPPROPRIATE HANG UPS FROM 6-9% | COMBINED FINAL TIMEOUTS, INVALIDS AND INAPPROPRIATE HANG UPS UNDER 6% | >10% | 9% | 7-8% | 6% | 0-5% |
| DIALOGUE AND MENUS | FULL | MISGUIDED=COUNTER PRODUCTIVE DESIGN THAT CONFUSES AND IRRITATES CALLERS | AMBIGUOUS-USES SOME BEST PRACTICES, BUT STILL CONFUSES CALLERS TO THE POINT OF EXHAUSTION | DISTINCT-USES BEST PRACTICES FOR OPTIMAL CUSTOMER SATISFACTION | 1 | 2 | 3 | 4 | 5 |
| PREFERENCE 1/2 RATE | HALF | THE AVERAGE OF THE TWO LOWEST MENU SELECTION IS 2% OR LESS | THE AVERAGE OF THE TWO LOWEST MENU SELECTION IS 3-10% | THE AVERAGE OF THE TWO LOWEST MENU SELECTION IS MORE THAN 10% | <2% | 3-4% | 5-6% | 7-9% | >10% |
| PERSONA-AUDIO QUALITY 1/2 RATE | HALF | AMATEUR VOICE TALENT AND/OR MULTIPLE VOICES | IMPROPER VOICE TALENT WITH INAPPROPRIATE PERSONA | PROFESSIONAL VOICE TALENT AND APPROPRIATE PERSONA | 1 | 2 | 3 | 4 | 5 |

FIG. 4A

| VALUE | 1 | 2 | 3 | 4 | 5 | WELCOME | SUB-RATING | WEIGHT |
|---|---|---|---|---|---|---|---|---|
| NEGATIVE BEHAVIOR | >15% | 12-14% | 9-12% | 6-8% | 0-5% | NA | 0 | 0.00 |
| CALLER DISCONTENT | >10% | 9% | 7-8% | 6% | 0-5% | 3% | 5 | 5.00 |
| DIALOGUE AND MENUS | 1 | 2 | 3 | 4 | 5 | AMBIG | 2 | 2.00 |
| PREFERENCE 1/2 RATE | <2% | 3-4% | 5-6% | 7-9% | >10% | 1.00% | 1 | 0.50 |
| PERSONA-AUDIO QUALITY 1/2 RATE | 1 | 2 | 3 | 4 | 5 | PRO | 5 | 2.50 |
| NAVIGATION LENGTH 1/2 RATE | >3:00 | 2:01-2:59 | 1:31-2:00 | 1:01-1:30 | <1:00 | :00 | 5 | 2.50 |
| PROMPT LENGTH 1/2 RATE | >:20 | 0:17-:20 | :14-:16 | :11-:13 | <:10 | :09 | 5 | 2.50 |
| | | | | | | | 23.00 | 15.00 |
| | | | | | | | | 0.75 |

FIG. 7

REAL-TIME MONITORING OF CALLER EXPERIENCE IN A CALL FLOW

CROSS REFERENCE TO RELATED APPLICATIONS

The present application is related to commonly assigned U.S. patent application Ser. No. 12/028,238 entitled REAL-TIME MONITORING OF CALLER EXPERIENCE FOR A GROUP OF STEPS IN A CALL FLOW, U.S. patent application Ser. No. 12/028,229 entitled REAL-TIME ADJUSTMENT FOR BETTER CALLER EXPERIENCE filed on even date herewith, the entire contents of which are incorporated by reference herein.

FIELD OF THE DISCLOSURE

The present disclosure relates generally to an automated voice response system. More particularly, the present disclosure provides a method, a system, and a computer readable medium comprising instructions for real-time monitoring of caller experience in a call flow in an automated voice response system.

BACKGROUND OF THE DISCLOSURE

Callers who called into one of many automated voice response systems for services have encountered different experience in navigating through the system. For example, a caller may not have understood a prompt that was provided by the system, and thus, experienced confusion in making a selection. Another example is that a caller may have missed an option that was provided in the selection, and thus, became lost in the system. In yet another example, a caller may have experienced a long delay in obtaining data from the system, and thus, hang up before the service was actually provided.

Caller confusions cause delays in providing services, and confused callers are more likely to hang up and retry their calls. In addition, confused callers who are dissatisfied with their services are more likely to terminate their relationships with their service providers. Furthermore, confused callers provide valuable insights in system improvements. For example, the need of confused callers for certain options in the system, the willingness of confused callers to adapt to new options or services introduced in the system, the amount of time confused callers are willing to wait for assistance, etc. Therefore, what is needed is a method and system for providing real-time monitoring of caller experience in an automated voice response system. In this way, service providers may dynamically review where callers are confused or frustrated in the system in order to provide corrective measures to improve system performance.

SUMMARY OF THE DISCLOSURE

A method for monitoring caller experience is provided. The method comprises collecting at least one selection by at least one caller in a call flow, generating performance analysis of a voice response system, combining the at least one selection and the performance analysis into a set of data, applying a monitoring formula to the set of data to form a result representing caller experience, and presenting the result to at least one service provider.

A system for monitoring caller experience is also provided. The system comprises a voice response system for processing at least one call from at least one caller, a voice or dial selection system for providing at least one selection to the at least one caller, a performance tuning system for tuning performance of the voice response system, and a caller experience monitoring system for monitoring caller experience of the at least one caller and presenting the caller experience to a service provider.

BRIEF DESCRIPTION OF THE DRAWINGS

FIG. 4A depicts a diagram illustrating an exemplary monitoring formula in accordance with one embodiment of the present disclosure;

FIG. 7 depicts a diagram illustrating an exemplary construction of a caller experience for each step of the call flow in accordance with one embodiment of the present disclosure.

DETAILED DESCRIPTION OF THE INVENTION

Figure 1:
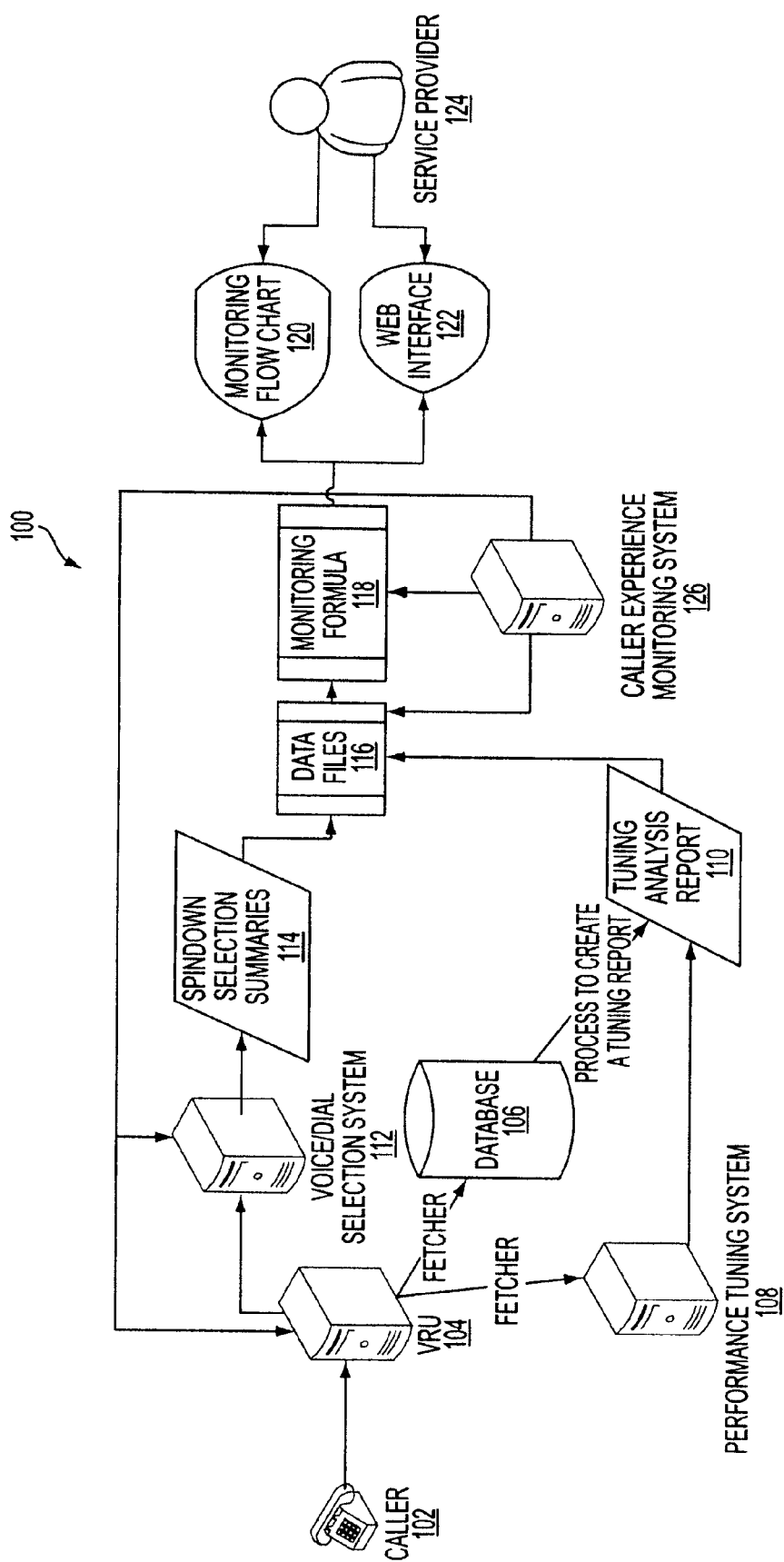
FIG. 1 depicts a diagram of a system for real-time monitoring of caller experience in a call flow in accordance with one embodiment of the present disclosure.

With reference to the figures and in particular with reference to FIG. 1, a diagram of a system for real-time monitoring of caller experience in a call flow is depicted in accordance with an embodiment of the disclosure. In system 100, caller 102 places a call to voice response system unit 104 via a device, such as a telephone, an Internet Protocol-enabled phone, or a data processing system, such as a computer. Upon receiving the call, voice response system unit 104 guides the caller 102 through a number of selection options in order to obtain the desired services. The voice response system unit 104 is communicably coupled to a database 106. For each call that the voice response system unit 104 handles, it collects data associated with the call and information about the caller and stores the data and information in database 106. The information may include the amount of time a caller spent on a prompt, the percentage of callers who reached a certain prompt, etc.

The voice response system unit 104 is also communicably coupled to a performance tuning system 108. Performance tuning system 108 monitors the performance of voice response system unit 104 for each call. Upon completion of a certain number of calls or upon request, performance tuning system 108 generates a tuning analysis report 110. The tuning analysis report 110 is used for analysis in improving performance and efficiency of the voice response system unit 104. Systems 104 and 108 may be a data processing system, such as a desktop computer, a laptop computer, a server or any other type of device capable of sending and receive information via a wired or wireless protocol. The transfer of information between system 104, database 106, and performance tuning system 108 may be accomplished via at least one of a wireless protocol, a wired protocol and a combination of a wireless protocol and a wired protocol. The steps performed in this figure are performed by software, hardware, firmware, and/or the combination of software, hardware, and/or firmware.

In addition to database 106 and performance tuning system 108, voice response system unit 104 is also communicably coupled to a voice/dial selection system 112. The voice/dial selection system 112 monitors voice or dial options selected by each caller 102 and generates spindown selection summaries 114. Spindown selection summaries 114 comprise a summary of selections made by each caller 102. The summaries provide useful data for analysis of the overall caller experience. Data from tuning analysis report 110 and spindown selection summaries 114 may then be combined into a number of data files 116 for processing.

Upon combining the data into data files, a caller experience monitoring system 126 then applies a monitoring formula 118 to data in the data files 116 to identify problem areas in caller experience. In one embodiment, monitoring formula 118 utilizes a set of metrics for monitoring caller experience. For example, one set of metrics may comprise seven criteria used to rate each step of the call flow. These criteria are applied against the data in data files 116 to generate results for review by the service provider 124. More details about the monitoring formula are discussed with reference to FIGS. 3, 4A, and 4B below.

The results may be presented in different formats. In one embodiment, the results may be presented in a monitoring flow chart that is color-coded to show problem areas. In an alternative embodiment, the results may be presented on a Web interface to service providers who may access it via the Internet. In addition to presenting the result to service provider 124, caller experience monitoring system 126 may provide helpful feedback to voice/dial selection system 112 and voice response system unit 104 to take corrective measures in order to improve the overall caller experience.

Figure 2:
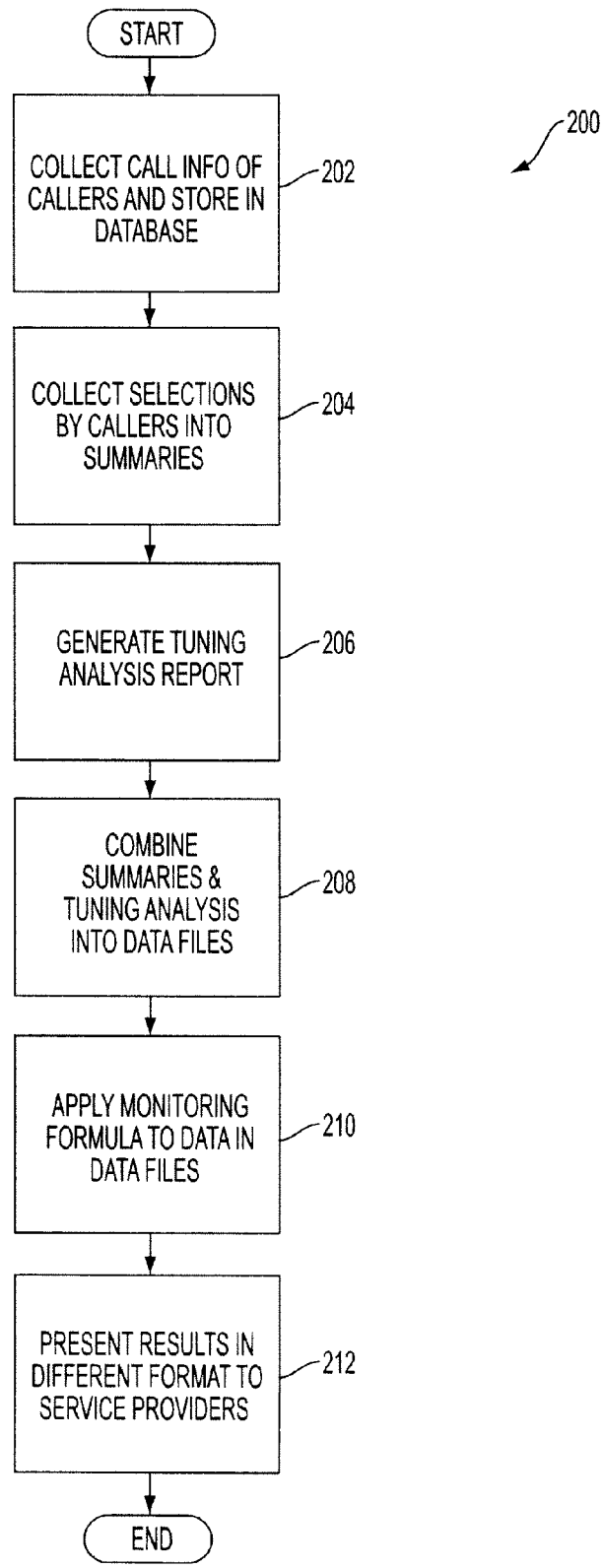
FIG. 2 depicts a flowchart of a process for real-time monitoring of caller experience in a call flow in accordance with one embodiment of the present disclosure.

Referring to FIG. 2, a flowchart of a process for real-time monitoring of caller experience in a call flow is depicted in accordance with one embodiment of the present disclosure. In this embodiment, process 200 may be implemented as instructions embodied in a computer readable medium executing within caller experience monitoring system 126. Process 200 begins at step 202 to collect call information and stores the information into a database 202. Next, process 200 continues to step 204 to collect selections by callers and stores them into spindown selection summaries. Process 200 then continues to step 206 to generate a tuning analysis report based on the data and information stored in the database. Upon generating the tuning analysis report, process 200 continues to step 208 to combine data from the tuning analysis report and the spindown selection summaries into a number of data files.

Process 200 then continues to step 210 to apply a monitoring formula to data in the number of data files to generate results for review by service providers. Process 200 then completes at step 212 to present the results in different formats to the service provider, who may then revised their call flow or add new steps in the call flow to improve the caller experience.

Figure 3:
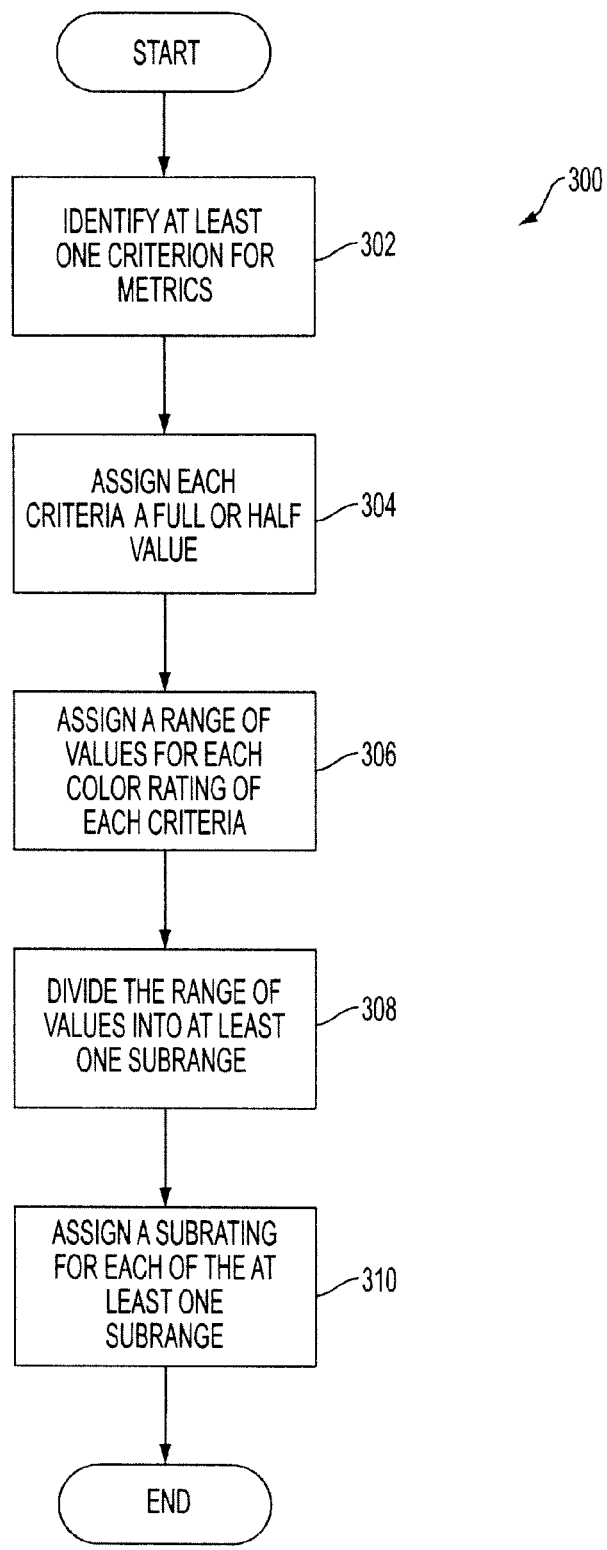
FIG. 3 depicts a flowchart of a process for developing a formula for monitoring caller experience in a call flow in accordance with one embodiment of the present disclosure.

Referring to FIG. 3, a flowchart of a process for developing a formula for monitoring caller experience in a call flow is depicted in accordance with one embodiment of the present disclosure. In one embodiment, process 300 may be implemented as instructions embodied in a computer readable medium executing within caller experience monitoring system 126. Process 300 begins at step 302 to identify at least one criterion for the set of metrics used to monitor caller experience. The at least one criterion may be inputted into the caller experience monitoring system by a customer or a service provider.

Next, process 300 continues to step 304 to assign each of the at least one criterion a full or half value. A full value provides a full rating for the criterion, while a half value provides a half rating for the criterion. Process 300 then continues to step 306 to assign a range of values for each color rating of each of the criteria. For example, for criterion "negative behavior", a range of 6% to 14% may be assigned to its yellow rating.

After a range of values is assigned for each color rating of each criterion, process 300 continues to step 308 to divide the range of values into at least one sub-range. For example, the range of 6% to 14% may be divided into a sub-range of 6% to 8%, a sub-range of 9% to 12%, and a sub-range of 12% to 14%. Process 300 then completes at step 310 to assign a sub-rating for each of the at least one sub-range. For example a sub-rating of 2 may be assigned to the sub-range of 12% to 14%, a sub-rating of 3 may be assigned to the sub-range of 9% to 12%, and a sub-rating of 4 may be assigned to the sub-range of 6% to 8%.

Figure 4B:
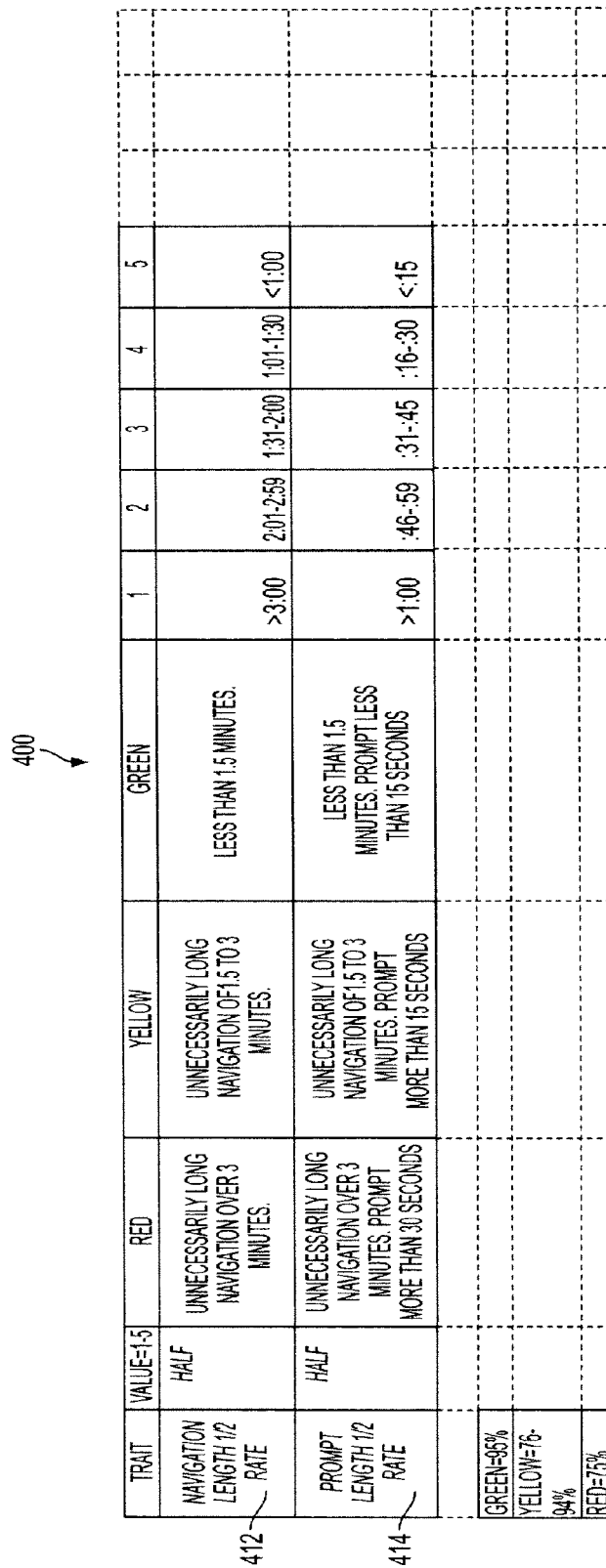
FIG. 4B depicts a diagram illustrating a continuation of an exemplary monitoring formula in accordance with one embodiment of the present disclosure.

Referring to FIGS. 4A and 4B, diagrams illustrating an exemplary monitoring formula are depicted in accordance with one embodiment of the present disclosure. In this example, monitoring formula comprises a set of metrics 400. In metrics 400, seven criteria are defined to monitor caller experience for each step of the call flow. The seven criteria comprise negative behavior 402, caller discontent 404, dialog and menus 406, preference 408, and persona audio quality 410. In addition, as shown in FIG. 4B, the seven criteria comprise navigation length 412 and prompt length 414. The seven criteria determine the overall customer satisfaction of the caller.

Monitoring formula 400 also provides a traffic light-like color rating for each dialog state. A green color-rating 416 represents that the caller experienced great customer satisfaction. A yellow color-rating 418 represents that the caller has serious questions about customer satisfaction. The yellow color-rating 418 notifies the service provider to examine weak areas of the designed call flow and make changes in a timely manner. A red color-rating 420 represents that the caller experience has been seriously impacted. In addition, call flow program efficiency has also been impacted and changes to the system are needed immediately.

In this example, each of the color ratings of the seven criteria is defined with a range of values. For example, negative behavior 402 is examined based on the combined one time timeouts and invalids. The range for combined one time timeouts and invalids is set to be fewer than 6% for the green rating, from 6% to 14% for a yellow rating, and over 15% for a red rating. Each of the color ratings is further sub-divided into sub-ratings of 1 to 5. For example, the yellow rating of negative behavior 402 is subdivided into sub-ratings 2 to 4 with rating 2 ranging from 12% to 14%, rating 3 ranging from 9% to 12%, and rating 4 ranging from 6% to 8%. With color-ratings and sub-ratings, monitoring formula 400 provides more accurate representation of caller experience. The lower the number of timeouts and invalids, the better the caller experience.

Unlike negative behavior 402, caller discontent 404 is examined based on combined final timeouts, invalids, and inappropriate hangups. The range for combined final timeouts, invalids, and inappropriate hangups is set to be fewer than 6% for the green rating, from 6% to 9% for a yellow rating, and over 10% for a red rating. The yellow rating of caller discontent 404 is further subdivided into sub-ratings 2 to 4 with rating 2 of 9%, rating 3 ranging from 7% to 8%, and rating 4 of 6%. Similar to negative behavior, the lower the number of timeouts, invalids, and unwanted hangups, the better the caller experience.

Dialogue and menus 406 are examined based on three categories: misguided, ambiguous, and distinct. Misguided means that the design of the call flow is counterproductive and it confuses and irritates callers. Ambiguous means some use of best practices, but the step still confuses callers to a point of exhaustion. Distinct means the use of best practices for optimal satisfaction. To achieve distinct quality, dialogues and menus should have low incidence of timeouts and invalids. Thus, the more distinct the use of dialogues and menus, the better the caller experience.

Preferences 408 represent callers' responses when the system requests data, for example, account numbers or don't-knows. Preferences are measured based on the average of the two lower menu selections. The range for the average is set to be fewer than 2% for the red rating, from 3% to 10% for a yellow rating, and over 10% for a green rating. The yellow rating of preferences 408 is further subdivided into sub-ratings 2 to 4 with rating 2 ranging from 3% to 4%, rating 3 ranging from 5% to 6%, and rating 4 ranging from 7% to 9%.

Persona-audio quality 410 measures the quality of a persona that is directed for instructional prompting. Because the system uses dynamic concatenation of life-live audio playback of data inputs entered by the callers, a higher quality the persona means a better caller experience. The quality of the persona is based on whether the persona-audio is an amateur voice and/or multiple voices, an improper voice, or a professional voice. Amateur voice and/or multiple voices are the least consistent with the persona of the service provider and thus receive a red rating. Improper voice receives a yellow rating, because it is less consistent with the persona of the service provider. Professional voice receives a green rating, because it is most consistent with the persona of the service provider.

Referring to FIG. 4B, navigation length 412 measures caller experience based on the length of navigation callers have to go through. The shorter the length of navigation, the better the caller experience. In this example, the range for navigation length 412 is set to be greater than 3 minutes for the red rating, from 1.5 minutes to 3 minutes for a yellow rating, and under 1.5 minutes for a green rating. The yellow rating of navigation length 412 is further subdivided into sub-ratings 2 to 4 with rating 2 ranging from 2 minutes to 3 minutes, rating 3 ranging from 1.5 minutes to 2 minutes, and rating 4 ranging from 1 to 1.5 minutes.

Prompt length 414 measures caller experience based on the length of the prompt callers have to go through. The shorter the length of the prompt, the better the caller experience. In this example, the range for prompt length 414 is set to be greater than 30 seconds for the red rating, from 15 to 30 seconds for a yellow rating, and under 15 seconds for a green rating. The yellow rating of prompt length 414 is further subdivided into sub-ratings 2 to 4 with rating 2 ranging from 46 to 59 seconds, rating 3 ranging from 31 to 45 seconds, and rating 4 ranging from 16 to 30 seconds.

Based on the seven criteria, an overall caller experience percentage is calculated from monitoring formula 400. In this example, an overall caller experience percentage of 95% or above achieves a green rating and represents great customer satisfaction, because the callers found this prompt helpful. An overall caller experience percentage of 76% to 94% achieves a yellow rating and represents serious questions in customer satisfaction, because the callers are confused. An overall caller experience percentage of 75% or below achieves a red rating and represents serious impact on overall customer satisfaction, because the callers are misguided.

Figure 5:
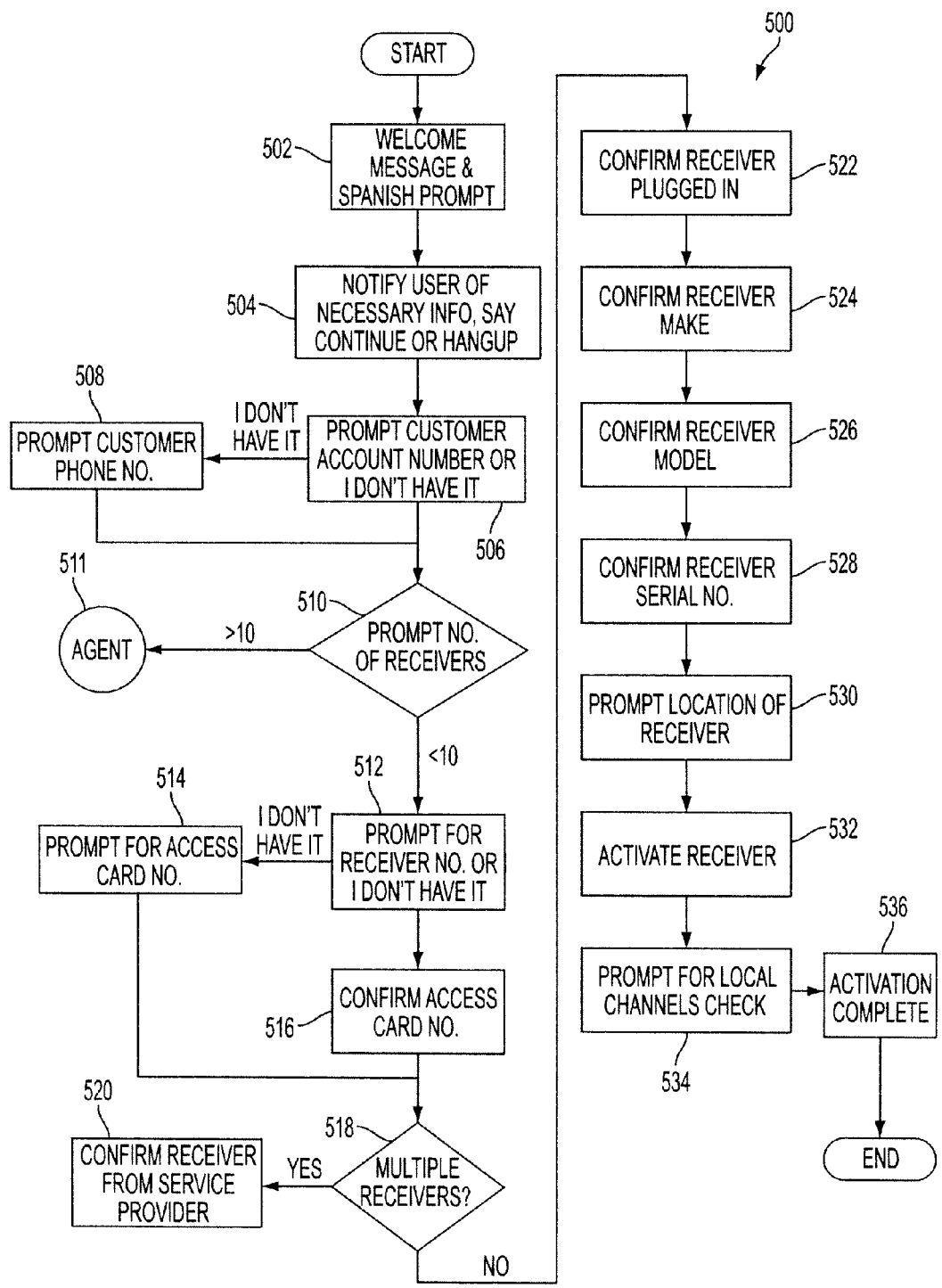
FIG. 5 depicts a flowchart of an exemplary monitoring call flow in accordance with one embodiment of the present disclosure.

Referring to FIG. 5, a flowchart of an exemplary monitoring call flow is depicted in accordance with one embodiment of the present disclosure. Process 500 may be implemented within voice response system, such as voice response system unit 104 when calls are received from callers 102. In this example, process 500 begins at step 502 to provide a welcome message and a prompt for Spanish-speaking customers to callers. Next, process 500 continues to step 504 to notify the caller of necessary information, such as account or phone number and a prompt for the user to say "continue" if the caller has the necessary information or simply hangup if the caller does not have the necessary information.

Process 500 then continues to step 506 to prompt the caller for a customer account number or to say "I don't have it" if the caller does not have the customer account number. If the caller says "I don't have it", process 500 continues to step 508 to prompt the caller for the customer phone number. If the caller enters a customer account number or phone number, process 500 continues to step 510 to prompt the number of receivers. If the caller enters more than ten receivers, process 500 continues to forward the call to an agent at step 511. If the caller enters ten or less receivers, process 500 continues to step 512 to prompt the caller for a receiver number or to say "I don't have it" if the caller does not have the receiver number.

If the caller enters a receiver number, process 500 continues to step 516 to prompt the caller to confirm the access card number. If the caller says "I don't have it", process 500 continues to step 514 to prompt the caller for an access card number, process 500 continues to step 518 to prompt the caller for multiple receivers. If the caller has multiple receivers, process 500 continues to step 520 to prompt the caller to confirm that the receiver is provided by the service provider. If the caller does not have multiple receivers, process 500 continues to step 522 to prompt the caller to confirm that the receiver is plugged in. Process 500 then continues to step 524 to prompt the caller to confirm the make of the receiver, to step 526 to confirm the model of the receiver, and to step 528 to confirm the serial number of the receiver. Process 500 then continues to step 530 to prompt the caller for the location of the receiver and to step 532 to activate the located receiver.

After the receiver is activated, process 500 continues to step 534 to prompt the caller for local channels check. If the user confirms that local channels are received, process 500 terminates at step 536 to notify the caller that activation is complete.

Figure 6:
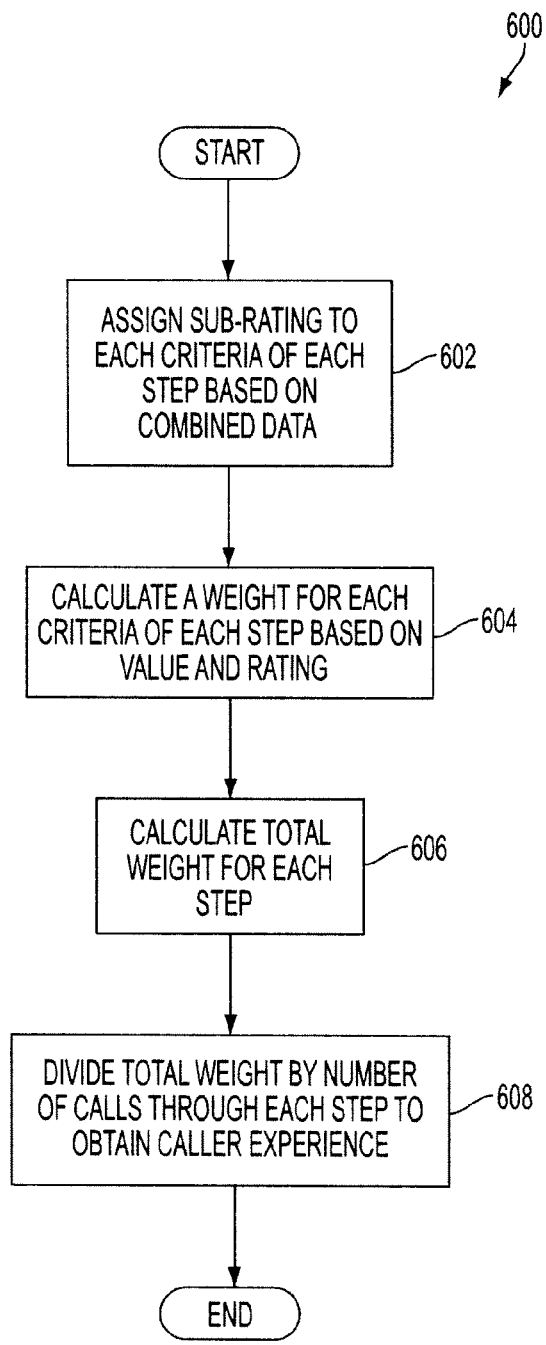
FIG. 6 depicts a flowchart of a process for developing a caller experience rating for each step of a call flow in accordance with one embodiment of the present disclosure.

After a monitoring call flow process is provided, caller experience monitoring system 126 may construct a caller experience for each step of the call flow. Referring to FIG. 6, a flowchart of a process for developing a caller experience rating for each step of a call flow is depicted in accordance with one embodiment of the present disclosure. In one embodiment, process 600 may be implemented as instructions embodied in a computer readable medium executing within caller experience monitoring system 126.

Process 600 begins at step 602 to assign a sub-rating to each criteria of each step of the call flow based on the combined data in the data files. The sub-rating may be assigned based on the range of values assigned to each sub-range. Next, process 600 continues to step 604 to calculate a weight for each criterion of each step based on previously-assigned value for the criterion and the assigned sub-rating from step 602. Process 600 then continues to step 606 to calculate a total weight for each step. The total weight may be obtained by totaling all the weights calculated in step 604. Process 600 then completes at step 608 to divide the total weight calculated in step 606 by the number of calls that were processed through each step. For example, if 20 calls were processed through the welcome message call step, the total weight is divided by 20.

Referring to FIG. 7, a diagram illustrating an exemplary construction of a caller experience for each step of the call flow is depicted in accordance with one embodiment of the present disclosure. In metrics 700, the combined data for each criteria of call flow step "welcome message" is listed under column 702. For example, the combined data for caller discontent is 3%. A sub-rating 706 is assigned for each criteria based on the range of values assigned to each sub-range. In this example, a sub-rating of 5 is assigned for the caller discontent for a sub-rating ranging from 0 to 5%. Because the combined data of 3% falls within this sub-rating, a sub-rating of 5 is assigned to this criterion.

After the sub-rating is assigned, a weight 708 is calculated for each criteria based on the previously-assigned value for each criteria and the sub-rating. In this example, a weight of 5 is calculated for caller discontent based on the full value that was previously assigned for this criteria and the sub-rating of 5. If a half value is assigned for this criterion, a sub-rating of 2.5 is calculated. After a weight is calculated for each criterion, a total weight is calculated by totaling all the calculated weights. In this example, the total weight of call flow step "welcome message" is 15. Once the total weight is obtained, a caller experience for this step is obtained by dividing the total weight by the number of calls that were processed through this call flow step. In this example, the number of calls that were processed through this step is 20. Therefore, the total weight of 15 is divided by 20 to obtain a caller experience of 0.75. Based on the caller experience of this step, a color rating may be assigned to this call flow step and an overall caller experience may be developed.

Figure 8:
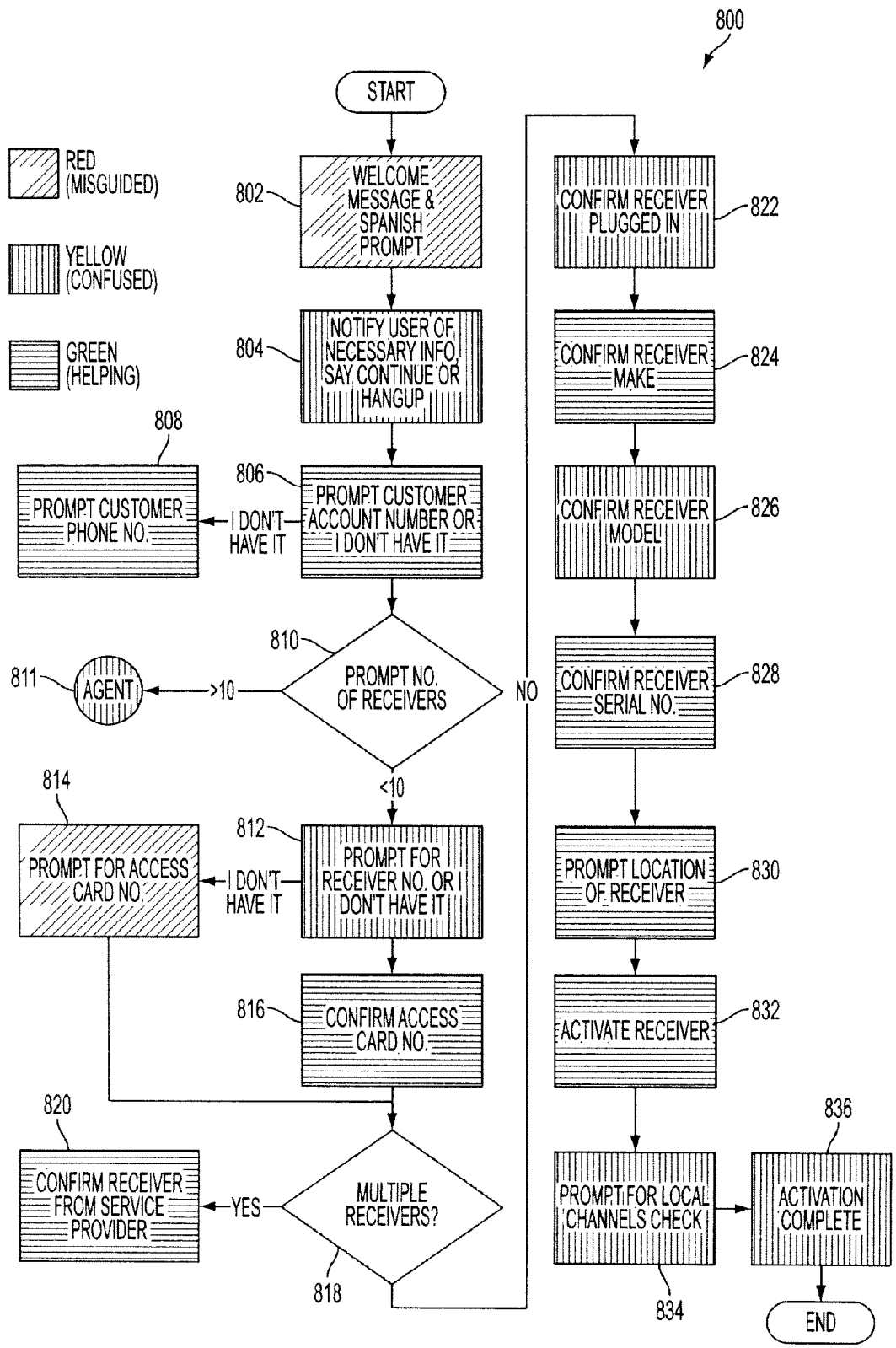
FIG. 8 depicts a diagram illustrating an exemplary color-coded monitoring flow chart in accordance with one embodiment of the present disclosure.

As discussed above, the result of caller experience may be presented to service providers in many formats. In one embodiment, the result may be presented in a monitoring flow chart that is color-coded to show problem areas. Referring to FIG. 8, a diagram illustrating an exemplary color-coded monitoring flow chart is depicted in accordance with one embodiment of the present disclosure. Some steps in process 800 are color-coded based on the caller experience obtained using process 600 in FIG. 6. For example, if the caller experience is greater than 0.95, the step is green color-coded. If the caller experience ranges from 0.76 to 0.94, the step is yellow color-coded. If the caller experience is less than 0.75, the step is red color-coded.

In FIG. 8, red color-coding is represented by crosshairs. Red color-coding means that the caller is misguided. Yellow color-coding is represented by vertical lines. Yellow color-coding means that the caller is confused. Green color-coding is represented by horizontal lines. Green color-coding means that the call flow step is helping the caller. In addition to red, yellow, and green color-codings, other indications may be implemented to represent different level of caller experience without departing the spirit and scope of the present disclosure. For example, an orange color-coding may be implemented to represent a caller experience that is more than confusing but less than misguiding the caller.

In this example, steps 802 and 814 are red color-coded, which means that these steps misguided callers. These steps seriously impacted caller experience and program effectiveness, and thus, need correction immediately. Steps 804, 812, 822, 826, 834, and 836 are yellow color-coded, which means that these steps confused the callers. These steps raise serious questions on customer satisfaction. These steps also identify weak areas that require correction in a timely manner. Steps 806, 808, 816, 820, 824, 828, 830, and 832 are green color-coded, which means that these steps are helping the callers. These steps provide great customer satisfaction and do not require modification.

Based on color-codings, service providers may conduct focus groups to identify corrective actions to increase program effectiveness and efficiencies. For example, service providers may redesign the dialogue or options of weak steps to increase usage by callers. The new dialogue may then be implemented in the voice response system 104 and the new option may be implemented in the voice/dial selection system 112. Once new dialogue or option is implemented, process 200 may be repeated to monitor caller experience of the improved program.

In summary, aspects of the present disclosure provide real-time monitoring of caller experience by collecting caller data, analyzing the data, and presenting the result to service providers. In addition to presenting the result in a monitoring call flow, the result may be presented in a Web interface or other formats including voice recordings, instant messaging, or email notifications. Based on the result, service providers or designers may modify or correct steps of the call flow to improve overall caller experience.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method for monitoring caller experience, the method comprising:
    collecting at least one selection by at least one caller in a call flow comprising a plurality of steps;
    generating performance analysis of a voice response system;
    combining the at least one selection and the performance analysis into a set of data;
    applying a monitoring formula to the set of data to form a result representing caller experience for each step of the call flow; and
    presenting the result to at least one service provider.

2. The method of claim 1, wherein the monitoring formula comprises a set of metrics for measuring the caller experience for each step of the call flow.

3. The method of claim 2, wherein applying a monitoring formula to the set of data comprises:
    identifying at least one criterion for the set of metrics; and
    assigning at least one value to each of the at least one criterion, wherein the at least one value is one of a full value or a half value.

4. The method of claim 3, further comprising:
    assigning a range of values to at least one color rating of each of the at least one criterion;
    dividing the range of values into at least one sub-range; and
    assigning a sub-rating to each of the at least one sub-range.

5. The method of claim 4, wherein the at least one color-rating is one of a red color-rating, a green color-rating, or a yellow color-rating.

6. The method of claim 4, wherein dividing the range of values into at least one sub-range comprises:
dividing the range of values into five sub-ranges.

7. The method of claim 4, further comprising:
calculating an overall caller experience for the monitoring formula based on the at least one criterion.

8. The method of claim 7, further comprising:
assigning at least one color rating to the overall caller experience, wherein the at least one color rating comprises a red color-rating, a green color-rating, and a yellow color-rating.

9. The method of claim 8, wherein a green color-rating represents that the at least one caller experience great customer satisfaction.

10. The method of claim 8, wherein a yellow color-rating represents that the at least one caller has serious questions about customer satisfaction.

11. The method of claim 8, wherein a red color-rating represents that the at least one caller experience has been seriously impacted.

12. The method of claim 4, further comprising:
assigning the sub-rating to each of the at least one criterion based on the set of data; and
calculating a weight for each of the at least one criterion based on the at least one value and the sub-rating.

13. The method of claim 12, wherein calculating a weight for each of the at least one criterion comprises:
multiplying the at least one value by the sub-rating.

14. The method of claim 12, further comprising:
calculating a total weight by totaling the weight for each of the at least one criterion; and
dividing the total weight by a number of calls through each step of the call flow to form the result.

15. The method of claim 8, wherein presenting the result to at least one service providers comprises:
presenting at least one color rating of the overall caller experience in a monitoring call flow.

16. The method of claim 8, wherein presenting the result to at least one service providers comprises:
presenting at least one color rating of the overall caller experience in a Web interface.

17. A system for monitoring caller experience comprising:
a voice response system for processing at least one call from at least one caller, the voice response system comprising a plurality of call flow steps and collecting at least one selection by the at least one caller;
a voice or dial selection system for providing at least one selection at at least one of the steps to the at least one caller;
a performance tuning system for generating performance analysis of the voice response system; caller experience monitoring system for combining the at least one selection and the generated performance analysis into a set of data; and applying a monitoring formula to the set of data to form a result representing caller experience for each step of the call flow; and
a caller experience monitoring system for monitoring caller experience of the at least one caller at each of the call flow steps and presenting the caller experience to a service provider.

18. The system of claim 17, wherein the voice or dial selection system comprises at least one selection summary comprising a summary of selections made by the at least one caller.

19. The system of claim 18, wherein the performance tuning system comprises at least one tuning analysis report generated based on caller information in a database.

20. The system of claim 19, wherein the caller experience monitoring system is operable to combine the at least one selection summary and the at least one tuning analysis report to form a set of data files.

21. The system of claim 20, wherein the caller experience monitoring system is further operable to apply a monitoring formula to data in the set of data files.

22. The system of claim 17, wherein the caller experience monitoring system is operable to present the result in a monitoring call flow to the service provider.

23. The system of claim 21, wherein the monitoring formula comprises a set of metrics for measuring caller experience.

24. The system of claim 17, wherein the caller experience monitoring system is operable to present the result in a Web interface to the service provider.

25. A non-transitory computer readable medium comprising instructions for:
collecting at least one selection by at least one caller in a call flow comprising a plurality of steps;
generating performance analysis of a voice response system;
combining the at least one selection and the performance analysis into a set of data;
applying a monitoring formula to the set of data to form a result representing caller experience for each of the plurality of steps; and
presenting the result to at least one service providers.

* * * * *